I. F. PFEIFFER.
SCALE.
APPLICATION FILED OCT. 22, 1915.
1,195,719. Patented Aug. 22, 1916.
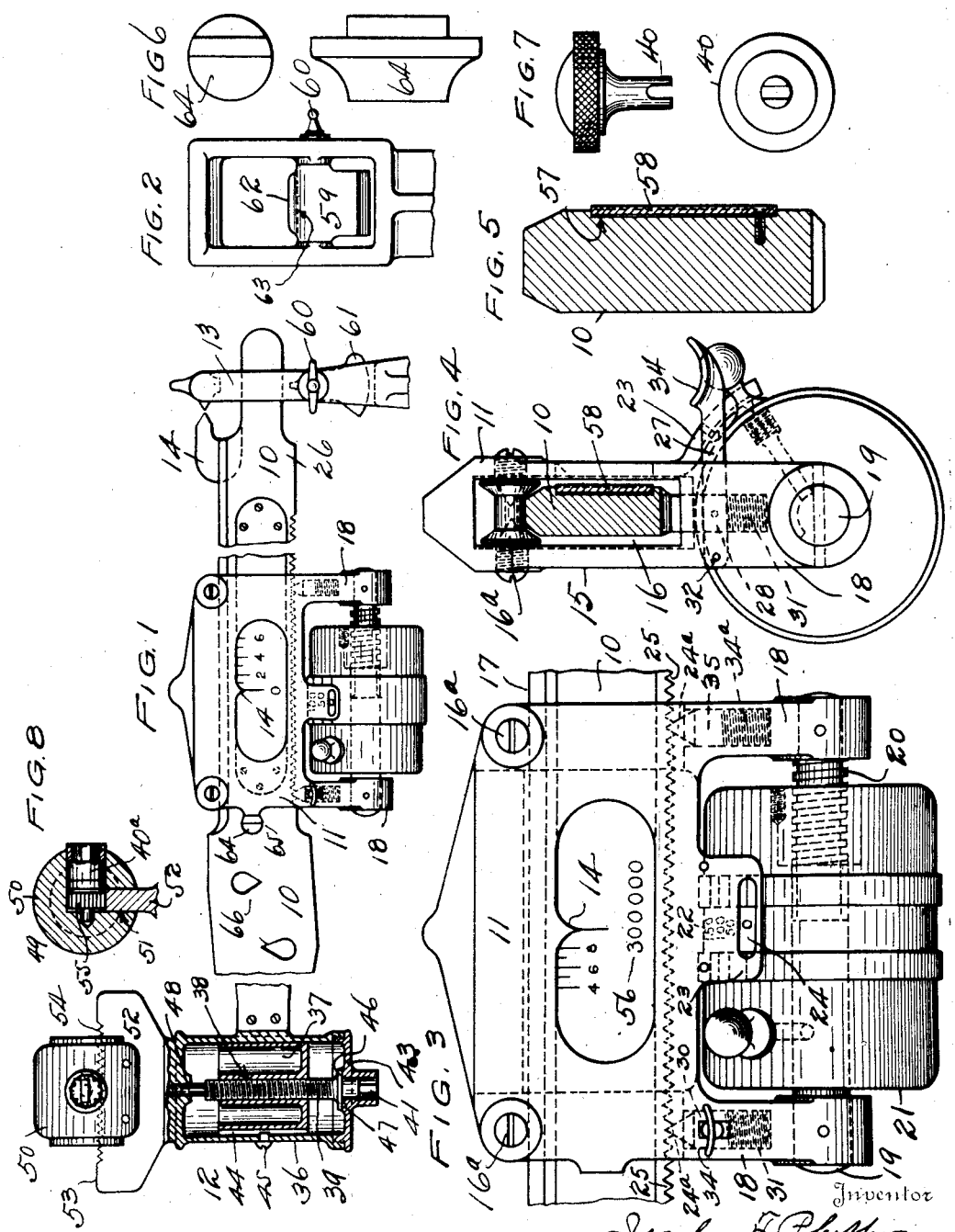

UNITED STATES PATENT OFFICE

ISADORE F. PFEIFFER, OF ALTOONA, PENNSYLVANIA.

SCALE.

1,195,719.  Specification of Letters Patent.  Patented Aug. 22, 1916.

Application filed October 22, 1915.  Serial No. 57,316.

*To all whom it may concern:*

Be it known that I, ISADORE F. PFEIFFER, a citizen of the United States, residing at Altoona, in the county of Blair and State of Pennsylvania, have invented certain new and useful Improvements in Scales, of which the following is a specification.

This invention relates to scales and has for its object improved means for balancing scale beams, as well as improved facilities for reading the correct weights indicated by the beam poise.

The primary object of this invention is to provide an improved scale beam which is easily manufactured, and readily balanced through the coöperation of the improved balancing feature and beam poise.

A further object of this invention is to provide a beam balancing feature whereby the center of gravity of the balance is shifted in a vertical plane and thereby effects the balance of the scale beam.

A still further object of the invention is to provide the scale beam with means for keeping the beam scale in a perfectly legible condition throughout the life of the scale, by recessing the beam and placing the beam scale in the recess then covering the recess with some durable transparent substance or material, as glass or celluloid.

To the above ends the present invention contemplates the novel construction, combination and arrangement of parts as will be hereinafter fully pointed out, illustrated and claimed.

It will be quite readily understood that this invention is susceptible of a wide range of structural change or modification without departing from the spirit or scope of the invention, but a preferred and practical embodiment of the invention is shown in the accompanying drawings, in which—

Figure 1 is a side elevational view of the improved beam having certain sections broken out for convenience in illustrating the beam. Fig. 2 is an end view of the scale beam, showing the trig arrangement. Fig. 3 is a front elevation of the beam poise together with a section of the beam associated therewith. Fig. 4 is an end elevation of the parts shown in Fig. 3. Fig. 5 is a cross sectional view of the scale beam, illustrating the method of attaching the beam scale to the beam. Fig. 6 shows plan and elevational views of the poise stop which is positioned in the beam as shown in Fig. 1 of the drawings. Fig. 7 shows edge and end views of the balance adjusting key as used to shift the balancing element in a vertical plane, as well as to move the balance ball in a horizontal plane. Fig. 8 is a sectional view of the balancing ball, the position of which is altered through the key shown in Fig. 7.

Similar reference numerals refer to similar parts throughout the several figures of the drawings.

In carrying out this invention I do not contemplate any change in the usual scale mechanism aside from the scale beam and its associated parts, hence the improvements that have been made are readily applicable to the usual form of scales wherein a beam and poise are used to indicate the weights; and to this end I provide a scale beam designated in its entirety by the numeral 10, having associated therewith a poise 11, a balancing feature 12 and a poise trig 13, together with a zero pointer 14.

The poise 11 primarily consists of a frame 15, having a slotted opening 16 through which the scale beam 10 protrudes. In order to provide for easy movement of the poise along the beam there is shown a plurality of pivotal bearing spools 16ª which coöperate and roll upon the top 17 of the scale beam 10. The frame 15 is further provided with a pair of pendent arms 18, each of which is made to carry one end of the threaded shaft 20, upon which is positioned a rotatable weight 21, having a suitable scale 22 placed upon the periphery thereof, the function of which will be described later in the specification.

In addition to the pendent arms 18, the frame 15 is provided with a hood shaped wing 23 being placed concentric with the weight 21, and having an oblong slot 24 cut therein for the purpose of reading the scale 22, as it rotates beneath the hood 23.

For the purpose of restricting or interrupting the movement of the poise 11, there is provided in each pendent leg 18, a spring actuated member having a cone-shaped point 24ª, adapted to engage a series of teeth like projections 25 cut upon the under surface 26 of the scale beam 10.

To facilitate ease of poise operation there is provided, in connection with one of the cone-shaped points 24ª, an operating lever 27, designed to operate in a slot 28, which is cut in the cylindrical body portion of the stop 30, which terminates in the point 24ª and is forced against the bottom of the beam 10 by a spring 31. The lever 27 is provided with a fulcrum 32 which engages the spring 31 at a point 33, positioned between the fulcrum 32 and a finger push device 34. A spring 34ª which is designed to possess less tension is positioned in the opposite pendent leg 18, and holds the stop 35 such that the point 24ª has a slight pressure engagement with the teeth cut upon the beam 10. When using this poise the index finger engages the finger push device 34 and with a slight pressure downward the point 24ª is disengaged when the poise can be moved along the beam 10, until the pointer 14 indicates the approximate balance, whereupon the weight 21 is rotated slightly, thus bringing the scale 22 with the exact pounds or fractions thereof under the window or slot 24, at which time the pointer 14 indicates the exact balance.

For the purpose of balancing the beam there is provided the balancing feature, designated by the numeral 12 and consists primarily of a cylindrical casing 36, having contained therein a cup-shaped receptacle 37, which is provided with a center threaded opening 38 adapted to be engaged by a screw 39, designed to be operated through the medium of a thumb screw device designated by the numeral 40, which engages a suitable pin 41, positioned in the neck 42 of the cap 43 of the cylinder 36.

For the purpose of keeping the cup-shaped receptacle 37 from rotating, when the screw is rotated, a slot 44 is provided in the side of the cup which is engaged by a screw 45 positioned in the cylindrical casing 36. Hence it can be readily seen that any rotation of the screw will cause a vertical motion of the cup shaped receptacle 37 and since the cup is designed to be more or less filled with lead, the raising or lowering of this weight will necessarily effect the balance of the scale beam 10.

For the purpose of locking the cup in any one selected position, there is provided a perforated collar 46, which is engaged by a pin 47, positioned in the cap 43; hence to rotate the screw it is first necessary to raise the collar above the pin 47, and for this purpose ample provision is made at the upper end 48 of the screw 39.

As a further aid in balancing the beam there is provided an adjustable cylindrical balancing device, designated by the numeral 49, and consists primarily of a weight 50 which is slotted out on one side 51 to receive an oblong plate 52, upon the top edge 53, of which is positioned a rack 54 which is engaged by a pinion gear 55, adapted to be rotated by means of the thumb screw device 40ª and key 40.

It is quite obvious that any movement of the weight 50, along the rack 54, will effect the balance of the beam, or a slight movement in the right direction will throw the beam in balance, if the same is out of balance.

It is obvious without further elaboration that the beam has two separate methods of balancing the same, either of which can be effectively used, or a combination of the two can be resorted to should it be deemed necessary by the operator.

The beam scale 56 is designed to be positioned in a recess 57 cut in the face of the beam 10. The scale 56 is preferably placed upon heavy paper and given a coat of moisture resisting material in order that the length may not change under different degrees of temperature. The scale is designed to be covered with a transparent substance 58 as glass or celluloid, then sealed in position. This construction obviates the trouble which arises from scale beams rusting and thereby obliterating the figures and scale divisions on the beam.

For the purpose of locking the scale beam in an inoperative position, there is provided a trig device 59, which when operated moves the beam upward, the natural direction for the beam to move when a load is applied to the scale. The trig device 59 is provided with the usual operating wing nut 60, and pawl 61, together with a resilient cushion 62 positioned on the face 63 of the trig. This device prevents any undue shock on the beam.

For the purpose of preventing the poise 11 from wedging on the beam, there is provided a poise stop 64 adapted to be positioned at the point 65 on the beam and engaged by the poise when the same is pushed back toward the fulcrum point 66.

Without further elaboration and description it is thought that the many advantages of the herein described invention are readily apparent and

What I claim and desire to be secured by Letters Patent is,

1. A scale including a scale beam, a poise shiftable on the beam, said poise including a poise body having a pointer for reading the scale on the beam, arms depending from the body of the poise, a threaded shaft journaled in the lower ends of the arms of said poise, a rotatable weight on said threaded shaft and having means for indicating the fractional pounds registered by the pointer on the scale beam, and a handle projecting radially from said weight for operating the same.

2. A scale including a scale beam, a poise slidable on the beam, said poise comprising a poise body, a plurality of anti-frictional rollers for riding on the top edge of the beam, spring pressed members for engaging the underside of the beam to hold the poise still, arms depending from the poise body, a threaded shaft journaled in said arms, a rotatable weight mounted in said threaded shaft and having means for indicating fractional parts of a pound after the poise has come to rest on the beam.

3. A scale including a scale beam, a poise slidable on the beam at one side of its fulcrum point and a balancing device carried by the beam on the other side of its fulcrum point, said balancing device including a casing, a vertically adjustable weight in said casing, an upstanding supporting member carried by said casing, and a horizontally shiftable weight mounted on said upstanding supporting member.

4. A scale including a scale beam, a poise slidable on the beam at one side of its fulcrum point, and balancing means carried by the beam on the other side of its fulcrum point, said balancing means including a casing, a weight arranged within the casing, a screw for shifting the weight longitudinally of the casing, a rack carried by the top of said casing, a weight straddling said rack, and means for shifting said latter weight along the rack.

5. A scale including a scale beam, a poise slidable on the beam at one side of its fulcrum point, and balancing means carried by the beam on the other side of its fulcrum point, said balancing means including a casing arranged in a perpendicular position, a weight holding receptacle shiftable within the casing longitudinally thereof, means carried by said casing for preventing the weight holding receptacle from rotating, a screw for shifting said receptacle, a rack carried by the upper part of said casing, a horizontally shiftable weight in straddling engagement with said rack, and an operating pinion carried by said horizontally shiftable weight.

In testimony whereof I affix my signature in presence of two witnesses.

ISADORE F. PFEIFFER.

Witnesses:
N. E. GEE,
ALEX. WEIR.